United States Patent [19]

Mueller

[11] Patent Number: 4,644,823
[45] Date of Patent: Feb. 24, 1987

[54] DIFFERENTIAL GEAR

[75] Inventor: Robert Mueller, Weissach, Fed. Rep. of Germany

[73] Assignee: Dr. Ing. H.C.F. Porsche Aktiengesellschaft, Fed. Rep. of Germany

[21] Appl. No.: 480,817

[22] Filed: Mar. 31, 1983

[30] Foreign Application Priority Data

Apr. 3, 1982 [DE] Fed. Rep. of Germany ....... 3212495

[51] Int. Cl.⁴ .............................................. F16H 1/44
[52] U.S. Cl. ..................................... 74/710.5; 74/713
[58] Field of Search ...................... 74/710, 710.5, 711, 74/863, 864, 865, 866, 867, 877; 192/85 A, 85 AA

[56] References Cited

U.S. PATENT DOCUMENTS

| | | | |
|---|---|---|---|
| 2,669,330 | 2/1954 | Banker | 192/85 AA |
| 2,872,794 | 2/1959 | Slomer | 192/85 AA |
| 2,991,664 | 7/1961 | Bernotas | 74/711 |
| 3,213,984 | 10/1965 | Cook | 192/85 AA |
| 3,446,320 | 5/1969 | Schott | 74/710.5 |
| 3,530,668 | 9/1970 | Siebers et al. | 74/866 |
| 3,554,341 | 1/1971 | Anderson | 192/85 AA |
| 3,576,241 | 4/1971 | Maurice | 192/85 AA |
| 3,657,935 | 4/1972 | O'Brien | 74/711 |
| 3,788,166 | 1/1974 | Hart et al. | 74/710.5 |
| 3,818,781 | 6/1974 | Goscenski, Jr. | 74/711 |
| 3,886,813 | 6/1975 | Baremor | 74/711 |
| 3,894,446 | 7/1975 | Snoy et al. | 74/710.5 |
| 3,945,475 | 3/1976 | Khatti | 74/710.5 |
| 3,974,717 | 8/1976 | Breed et al. | 74/710.5 |
| 3,986,576 | 10/1976 | Cummins et al. | 74/710.5 |
| 4,070,924 | 1/1978 | Moreno et al. | 74/710.5 |
| 4,249,429 | 2/1981 | Denning | 74/711 |
| 4,263,824 | 4/1981 | Mueller | 74/711 |
| 4,266,648 | 5/1981 | Martin | 192/85 AA |
| 4,389,909 | 6/1983 | Goscenski, Jr. | 74/711 |
| 4,412,459 | 11/1983 | Goscenski, Jr. | 74/711 |
| 4,445,400 | 5/1984 | Sullivan et al. | 74/711 |
| 4,462,272 | 7/1984 | Roper | 74/711 |

FOREIGN PATENT DOCUMENTS

| | | |
|---|---|---|
| 1455879 | 1/1976 | Fed. Rep. of Germany . |
| 2605228 | 8/1977 | Fed. Rep. of Germany ........ 192/85 AA |
| 1318548 | 3/1962 | France .............................. 74/711 |
| 0164228 | 12/1981 | Japan ............................ 192/85 AA |

Primary Examiner—Leslie Braun
Assistant Examiner—David Novais
Attorney, Agent, or Firm—Barnes & Thornburg

[57] ABSTRACT

A differential gear for motor vehicles with four bevel gears in meshing engagement, of which one each is coordinated to a respective one of the two axle output shafts; a lamellae package is arranged on the bevel gear of one axle output shaft, which is adapted to be clutched by an engaging clutch built-in within the area of the bevel gear of the other axle output shaft for the frictional connection and locking of the differential.

23 Claims, 3 Drawing Figures

DIFFERENTIAL GEAR

The present invention relates to a differential gear for motor vehicles which is adapted to be blocked by an elastic compression of a lamellae package arranged thereat.

According to the German Auslegeschrift No. 14 55 879, the bevel gears of a differential gear which are coordinated to the axle output shafts are provided with one lamellae package each serving as clutch. These lamellae clutches are stressed by spring disks which are inserted between the differential gear housing and the displacement members of the lamellae clutch. During the starting of the vehicle, the wheel torque produces a brake force at the teeth of the differential gears and axle drive bevel gears in meshing engagement with each other, which displaces the spur bevel gears outwardly by a distance corresponding to the torque which is available. At the same time, the displacement members of the lamellae clutches are moved outwardly in the direction of the axle output shafts against the force of the spring disks, as a result of which the axial pressure on the lamellae clutch is reduced to such an extent that a normal differential action of the differential gear is achieved. Only if a wheel stands still or loses its road traction, the associated lamellae clutch is compressed by the spring disks to such as extent that the differential gear is blocked.

This prior art differential gear with automatically adjusting blockage of the differential action entails the disadvantage that the blocking action is dependent solely from the produced wheel torque and in that the blocking action therebeyond can change in an undesired manner by manufacturing inaccuracies, wear and fatigue of the spring disks.

It is the object of the present invention to eliminate these disadvantages and to provide a blockable differential gear whose blocking action is controllable in a predetermined manner, cannot change uncontrollably and is adapted to be matched to different operating conditions of different vehicles.

The underlying problems are solved according to the present invention in that the force on the lamellae package is produced by an engaging mechanism which consists of a displaceable engaging bearing, an engaging spring and pressure elements. Since the differential gear is provided with a lamellae package which is adapted to be frictionally connected by an engaging mechanism, as is generally customary in a similar construction for the clutching of motor vehicle transmissions, the possibility is created to meter the blocking action of the differential by variation of the clutch force and to render the same accurately adjustable independently of wear which may have occurred in the meantime. The lamellae package is thereby prestressed by the spring of the engaging clutch by way of different intermediate members, which spring is prestressed during actuation of the engaging clutch to such an extent until the lamellae abut frictionally at one another and the differential is blocked.

In one embodiment of the present invention, the differential gear includes meshing bevel gears within a differential gear housing, of which two are secured on the two axle output shafts, and in which the lamellae package is arranged between the bevel gear of the one axle output shaft and the differential gear housing while the engaging clutch disposed within the area of the opposite bevel gear acts on the lamellae package, whereby the engaging clutch consists of a hydraulic ring, of an engaging bearing, of a cup spring, of a pressure member as well as of several pins longitudinally guided in the differential housing.

For a fully automatic control of the engaging clutch and a blocking of the differential gear, the engaging clutch is controlled by individual characteristic magnitudes of the vehicle or by a combination thereof which are functionally linked with each other. The engine torque, the suction pipe vacuum, the gas pedal position, the steering force, the steering angle, the brake force, the axle load distribution, the wheel slippage, the vehicle velocity and/or the shifting level position of the transmission may be used as controlling characteristic magnitudes, whereby the characteristic magnitudes control as pressure signals or as electrical adjusting signals a servo mechanism of the engaging clutch.

The advantages of a differential gear in accordance with the present invention become particularly valid if it is used as a distributor gear in an all-wheel or four-wheel drive. In this case, a planetary gear differential gear is used which enables an unequal distribution of the driving torque onto the front axle and rear axle.

These and other objects, features and advantages of the present invention will become more apparent from the following description when taken in connection with the accompanying drawing which shows, for purposes of illustration only, several embodiments in accordance with the present invention, and wherein.

Figure 1:
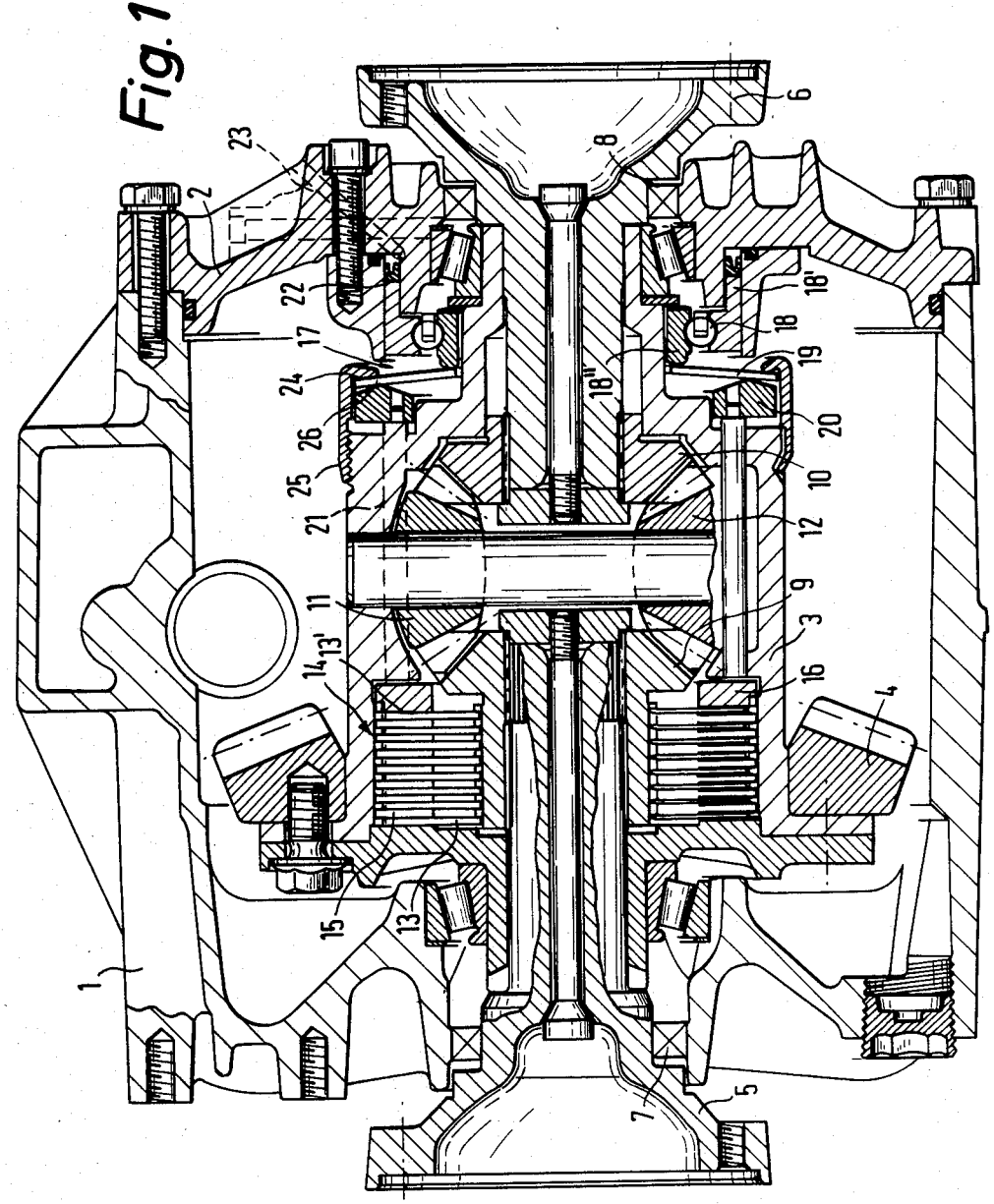
FIG. 1 is a cross-sectional view through a differential gear in accordance with the present invention.

Referring now to the drawing wherein like reference numerals are used throughout the various views to designate like parts, and more particularly to FIG. 1, a differential housing 3 is rotatably supported in an outer housing 1 which is closed off by a cover 2 bolted to the side of the outer housing 1. A spur bevel gear 4 is flangedly connected externally on the differential housing 3, which is driven by a bevel gear (not shown) and thereby takes along the axle output or drive shafts 5 and 6 nonrotatably secured on both sides in the differential housing 3; the extension of the axle drive or output shafts 5 and 6 through the outer housing 1 is sealed off by lip seals 7 and 8. Bevel gears 9 and 10 are secured on spline profiles of the axle output shafts 5 and 6; the bevel gears 9 and 10 are in meshing engagement with bevel gears 11 and 12 which are rotatably supported in the differential housing 3 perpendicularly to the axle output shafts 5 and 6. The bevel gear 9 of the left axle drive shaft 5 is provided with axially extending grooves; the inner lamellae 13 of a lamellae package generally designated by reference numeral 14 are inserted into the axially extending grooves while the outer lamellae 15 are non-rotatably held in axial grooves of the differential housing 3. A pressure plate 16 abuts at the innermost inner lamellae 13', by way of which the engaging clutch generally designated by reference numeral 17 acts on the lamellae package 14. The engaging clutch 17 consists of the engaging bearing 18 with outer race 18' and inner race 18", of the cup spring 19, of a pressure member 20, and of the pins 21 attached thereto which are longitudinally guided within bores of the differential housing 3 and resiliently abut at the pressure plate 16. A grooved hydraulic ring 22 abuts at the outer race 18' of the engaging bearing 18; the hydraulic ring 22 is adapted to be acted upon with pressure liquid by way of a bore 23 in the cover 2 of the outer housing 1, which pressure liquid is supplied by way of a hose connection (not shown).

If pressure is applied on the hydraulic ring 22, it is displaced toward the left and stresses the cup spring 19 by way of the engaging bearing 18 which also slides toward the left; the cup spring 19 pivotally rests at a support point 24 of an adjusting nut 25. The pressure member 20 together with the pins 21 are displaced toward the left at the abutment place 26 which is slightly offset radially inwardly. The inner lamellae are pressed by way of the pressure plate 16 against the outer lamellae and thus establish a frictional connection from the differential housing 3 to the bevel gear 9, as a result of which the differential is blocked. The blocking effect is preadjustable by adjustment of the adjusting nut 25 and is additionally adjustable by the magnitude of the hydraulic pressure. The hydraulic pressure is controllable either directly or by way of a servo-actuation by the characteristic magnitudes of the motor vehicle such as driving velocity, steering angle or engine torque so that a fully automatic matching of the blocking action to the different operating conditions of the vehicle is attainable.

Constructively of advantage is the short force flow or force transmission within narrowest space from the pressure member 20, by way of the pins 21 and the pressure plate 16 to the outer area of the lamellae package 14 and by way of the walls of the differential housing 3 back to the cup spring 19. The small distance from the support place 24 to the abutment place 26 of the pressure member 20 in conjunction with the relatively large distance to the engaging place 27 of the inner race of the engaging bearing 18 at the cup spring 19 produces a favorable transmission ratio for the clutching operation which makes possible a fine-sensitive adjustment of the blocking action of the differential.

However, in lieu of the direct actuation of the hydraulic ring, also an actuation by means of a hydraulic piston attached at the outer housing may be used which engages at the engaging bearing by way of a lever linkage. For some applications, a purely mechanical actuation of the engaging clutch by way of a Bowden cable is also of advantage.

Figure 2:
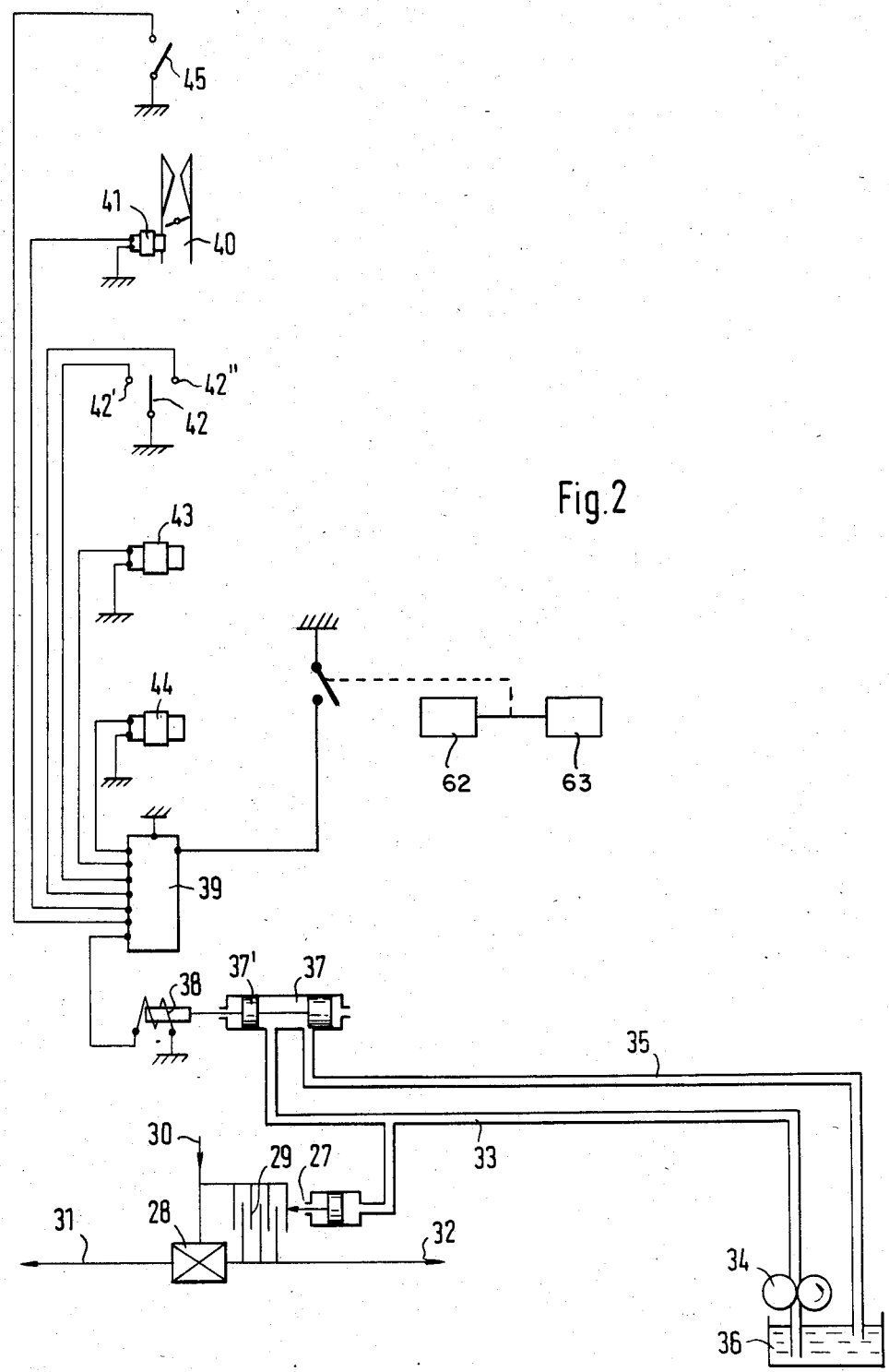
FIG. 2 is a schematic control diagram for automatically controlling a differential gear in accordance with the present invention.
Figure 3:
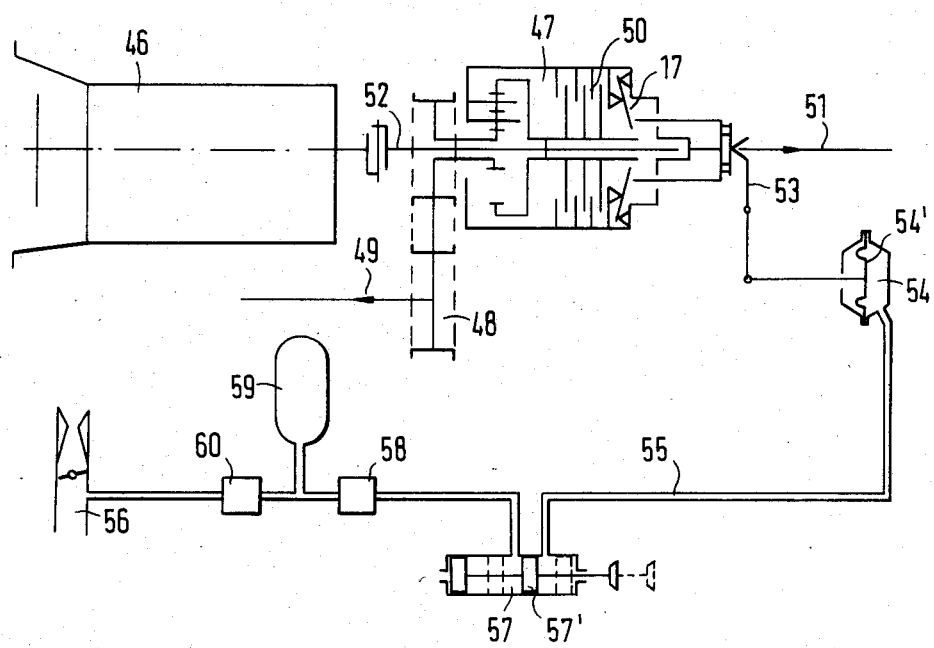
FIG. 3 is a schematic diagram of a modified embodiment of a manual control system for a differential gear in accordance with the present invention used as distributor gear in a four-wheel-drive vehicle.

Particularly advantageous control systems of the engaging clutch 17 for a differential gear which is arranged in the distributor gear of an all-wheel drive, are illustrated in FIGS. 2 and 3.

According to FIG. 2, the engaging clutch 17 is represented by a hydraulic piston with actuating arrow 27, which acts on a lamellae clutch 29 attached at the differential gear 28. A drive shaft 30 leads to the differential gear 28; the latter includes an output shaft 31 to the front axle as well as an output shaft 32 to the rear axle. The hydraulic piston is connected to a hydraulic line 33 which is supplied by a pump 34. For the pressure control, a pressure control valve 37 is installed between the hydraulic line 33 and a return line 35 leading to a reservoir tank 36. The control piston 37' of the pressure control valve 37 is displaceable by an electromagnetic adjusting actuation 38 which is connected to an electronic control apparatus 39 of any known construction.

Several characteristic magnitudes of the motor vehicle act on the control apparatus 39, which are each detected by measurement value pick-ups or transmitters and switches and are used in an advantageous manner for the control of the engaging clutch 17. A vacuum pick-up mounted at the suction pipe 40 of the internal combustion engine and a switch 42 whose one contact 42' indicates the first speed and whose other contact 42" indicates the second speed of a change-speed gear and which applies a corresponding signal to the control apparatus, are among such transmitters and switches. In case of automatic transmissions, two positions of the transmission selector lever are indicated by the two switching positions 42' and 42". The combined control by the suction pipe vacuum and the engaged gear is suitable for load simulation. It can be seen from the known traction diagrams that the load dependency of the control is meaningful only in first and second gear; an overheating of the lamellae clutch 29 due to continuous slippage at higher velocities is avoided thereby which may occur, for example, as a result of unevenly worn tires. The inner friction of the distributor gear as such already leads to a somewhat larger band width of the traction efficiency factor so that the lamellae clutch should be used only above friction values larger than about 0.4. The critical range on icy roads can thus be travelled without stresses negatively influencing the driving behavior.

Furthermore, a pressure transducer or pick-up 43 is connected to the control apparatus 39 which signals the pressure of the brake fluid. With a four-wheel drive, a clutching of all wheels is desirable; compared to simple brake force limiters, it produces an improved braking behavior. The drive design of the distributor-differential gear 28, however, leads to a mismatch during braking. This has to be countered with a brake force-dependent engagement of the lamellae clutch 29. Thus, with a different traction in front and in the rear, for example, by mounting snow chains on the rear wheels, the front wheel brakes may take over a part of the rear wheel braking pwoer. The front wheels are prevented from overbraking by the control according to the present invention and thus remain capable of steering.

In order to prevent bracing by high steering forces which result with narrow radii of curvature and high friction values, a steering-servo transmitter 44 applies a signal to the control apparatus 39 in case of high steering forces for the disengagement of the lamellae clutch.

Additionally, the lamellae clutch can be so controlled by way of rotational speed sensors 62 and 63 at the front axle and rear axle drive, respectively, that also act on control 39 to cause the clutch 29 to engage as soon as the rotational speed difference in the distributor gear is larger than 77 1/min; this value corresponds to a limit velocity of the narrowest curve with a friction value $\mu = 1$.

In order to maintain better control over the motor vehicle by a manual control in case of an extraordinary driving behavior, for example, with rear snow chains or in case of extremely unequal friction values at the front wheels and rear wheels, a manually actuated switch 45 is connected to the control apparatus 39, whereby the electronic control of the distributor gear is rendered inoprable by the actuation of the switch 45.

A servo actuation of the distributor differential gear which is to be actuated by means of a manual shifting valve is illustrated in FIG. 3.

A distributor gear 47 driven by a change-speed gear 46 includes a chain drive 48, by way of which takes place the drive 49 to the front axle, a planetary gear differential gear having a lamellae clutch 50, as well as an engaging clutch 17. The output shaft 51 to the rear axle is disposed coaxially to the input shaft 52 from the change speed gear 46 and is constantly driven by the same. The output or drive 49 to the front axle will be engaged only upon actuation of the engaging clutch 17. For that purpose, the engaging clutch 17 is operatively connected by way of a lever linkage 53 with a diaphragm servomechanism 54, whose diaphragm 54' is acted upon by the suction pipe vacuum. For the control of the vacuum, a manual shifting valve 57 is connected into the connecting line 55 from the diaphragm servo mechanism 54 to the suction pipe 56; the control piston 57' of the manual shifting valve 57 is longitudinally displaceable by hand and thereby selectively applies the full suction pipe pressure to the diaphragm 54' or a vacuum reduced by way of an opening leading to the atmosphere. A pressure-limiting valve 58, a reservoir tank 59 and a return check valve 60 are provided between the manual shifting valve 57 and the suction pipe 56 as further structural components which are necessary for a trouble-free operation of the pneumatic control installation.

While I have shown and described several embodiments in accordance with the present invention, it is understood that the same is not limited thereto, but is susceptible of numerous changes and modifications as known to those skilled in the art, and I therefore do not wish to be limited to the details shown and described herein but intend to cover all such changes and modifications as are encompassed by the scope of the appended claims.

I claim:

1. A differential gear for motor vehicles which is operable to be blocked by compression of a lamellae package means arranged thereat, characterized in that an engaging force is applied on the lamallae package means by an engaging clutch means which includes a displaceable engaging bearing means, an engaging spring means and pressure elements, and having a differential housing means, bevel gears in meshing engagement within said differential housing means, of which two bevel gears are secured on two axle output shafts, characterized in that the lamellae package means is arranged between the bevel gear of one axle output shaft and the differential housing means, the engaging clutch means being located within the areaa of the opposite bevel gear and being operable to act on the lamellae package means, the engaging clutch means including a hydraulic ring, the engaging bearing means, a cup spring as spring means and a pressure member, and several pins longitudinally guided in the differential housing means operatively connecting the engaging clutch means to the lamellae package.

2. A differential gear according to claim 1, characterized in that the engaging clutch means is controlled by several characteristic magnitudes of the motor vehicle.

3. A differential gear according to claim 2, characterized in that the engaging clutch means is controlled by a combination of individual characteristic magnitudes which are functionally linked with each other.

4. A differential gear according to claim 3, characterized in that at least one of an engine torque, a suction pipe vacuum, a gas pedal position, a steering force, a steering angle, a brake force, an axle load distribution, a wheel slippage, a driving velocity and a shifting lever position of the transmission are used as controlling characteristic magnitudes, the characteristic magnitudes controlling a servo means of the engaging clutch means as actuating signals.

5. A differential gear according to claim 4, characterized in that the engaging clutch means is actuatable manually by at least one of a Bowden cable and a hydrostatic transmission means.

6. A differential gear according to claim 5, characterized in that the engaging clutch means is controllable by characteristic magnitudes of the motor vehicle by way of a central control apparatus means, the control by characteristic magnitudes being operable to be blocked by a manually actuated switch means.

7. A differential gear according to claim 4, characterized in that the differential gear is used in a distributor gear of an all-wheel drive.

8. A differential gear according to claim 7, characterized in that a planetary gear-differential gear is used which distributes unevenly a driving torque of a rear axle to a front axle.

9. A differential gear according to claim 7, characterized in that the engaging clutch means is controllable by a suction pipe vacuum by way of a manual shifting valve means and a diaphram servo-means.

10. A differential gear according to claim 7, characterized in that the engaging clutch means is controlled as a function of load and in that a respectively engaged transmission step is incorporated into the control by a switch means at a change-speed gear selecting level of an automatic transmission by way of the control apparatus means.

11. A differential gear according to claim 7, characterized in that the engaging clutch means is actuatable by a steering force pick-up means in such a manner that it is disengageable in case of high steering forces.

12. A differential gear according to claim 7, characterized in that the engaging clutch means is controllable by the pressure of a brake fluid by way of a brake pressure transmitter means.

13. A differential gear according to claim 7, characterized in that the engaging clutch means is controllable by rotational speed sensors at a front axle and a rear axle drive of the motor vehicle in such a manner that the clutch means is engaged beginning with a rotational speed difference in the distributor gear of about 77 1/min.

14. A differential gear according to claim 8, characterized in that the planetary gear differential gear distributes the driving torques in the ratio of about 1.25:1 rear axle to front axle.

15. A differential gear according to claim 1, characterized in that the engaging bearing means includes an inner race and an outer race, the inner race abutting at the inner edge of the cup spring while the outer edge of the cup spring pivotally rests at a support place fixed with respect to the differential housing means, the abutting place of the pressure member at the cup spring being arranged at a slight radial distance inwardly with respect to the support place.

16. A differential gear according to claim 15, characterized in that the support place is provided at an adjusting nut which is threadably secured externally on the differential housing means in the direction of the axle output shafts.

17. A differential gear according to claim 15, characterized in that several pins are mounted at the pressure member which are longitudinally guided in the differential housing means substantially in the direction of the axle output shafts and which act on the radially outer area of the lamellae package means by way of a pressure plate.

18. A differential gear according to claim 1, characterized in that several pins are mounted at the pressure member which are longitudinally guided in the differential housing means substantially in the direction of the axle output shafts and which act on the radially outer area of the lamellae package means by way of a pressure plate.

19. A differential for motor vehicles with selectable locking action, wherein a multiple disk clutch is actuated by an engagement bearing through a transmission means including actuating element means acted on by a spring means serving as a power storage device, characterized by the fact that the spring is a cup spring abutting a differential housing means and located between the engagement bearing and actuating element means, and wherein the actuating element means operates on the multiple disk clutch which is disposed in the differential housing, and wherein a control operates to move the engagement bearing in response to at least one operating condition of the motor vehicle, further comprising plural bevel gears meshing in the differential housing, two of said gears being mounted on two axle drive shafts, characterized by the fact that the multiple disk clutch is disposed between the bevel gear of one axle drive shaft and the differential housing, and wherein the engaging bearing is located in the vicinity of the opposite bevel gear, the control means includes a hydraulically actuated ring engaging the engagement bearing, a pressure piece is interposed in the transmission means between the spring and the actuating element means, and wherein the actuating element means consists of a plurality of pins guided between the disk clutch and the pressure piece.

20. Differential according to claim 19, characterized by the fact that the engagement bearing has an inner portion which abuts an inner edge of the cup spring with the outer edge of the cup spring being applied pivotably against a solid contact point on the differential housing, and with a contact portion of the pressure piece disposed at a slight radial distance inward of said contact point.

21. Differential according to claim 20, characterized by the fact that the contact point is mounted on an adjusting nut which is screwed onto the differential housing in the axial direction of one of the axle drive shafts.

22. Differential according to claim 20, characterized by the fact that the plurality of pins are inserted in the pressure piece, said pins being guided lengthwise in the differential housing in the axial direction of one of the axle drive shafts and acting circumferentially on a pressure plate on the radial outer area of the multiple disk clutch.

23. Differential according to claim 19, characterized by the fact that the plurality of pins are inserted in the pressure piece, said pins being guided lengthwise in the differential housing in the axial direction of one of the axle drive shafts and acting circumferentially on a pressure plate on the radial outer area of the multiple disk clutch.

* * * * *